United States Patent
Yamashita

(10) Patent No.: US 6,360,206 B1
(45) Date of Patent: Mar. 19, 2002

(54) ELECTRONIC SHOPPING SYSTEM

(75) Inventor: Osamu Yamashita, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/282,179

(22) Filed: Mar. 31, 1999

(30) Foreign Application Priority Data

Apr. 27, 1998 (JP) ............................................ 10-117483

(51) Int. Cl.$^7$ .............................................. G06F 17/60
(52) U.S. Cl. ........................................................ 705/14
(58) Field of Search ........................... 705/14, 26, 54; 235/380, 493

(56) References Cited

U.S. PATENT DOCUMENTS

| | | | |
|---|---|---|---|
| 4,949,256 A | * 8/1990 | Humble ..................... | 705/14 |
| 5,380,991 A | * 1/1995 | Valencia et al. ............. | 235/383 |
| 5,708,782 A | * 1/1998 | Larson et al. .................. | 705/14 |
| 5,710,886 A | * 1/1998 | Christensen et al. .......... | 705/14 |
| 5,794,210 A | * 8/1998 | Goldhaber et al. ............ | 705/14 |
| 5,983,196 A | * 11/1999 | Wendkos ....................... | 705/14 |
| 5,999,914 A | * 12/1999 | Blinn et al. ................ | 705/14 X |

FOREIGN PATENT DOCUMENTS

| | | | | |
|---|---|---|---|---|
| WO | WO 96/39674 | * 12/1996 | ................... | 705/14 |
| WO | WO 99/03056 | * 1/1999 | ................... | 705/14 |
| WO | WO 99/46708 | * 9/1999 | ................... | 705/14 |

OTHER PUBLICATIONS

"Retailers Leaping onto the Web," by Ed Rubinstein, Discount Store News, Aug. 7, 1995.*

* cited by examiner

Primary Examiner—Stephen Gravini
(74) Attorney, Agent, or Firm—Rabin & Berdo, P.C.

(57) ABSTRACT

The present invention realizes on an electronic shopping system a discount service that makes use of a discount coupon. Electronic data that serves as a discount coupon comprises data for identifying a product to be discounted, data for indicating a discount amount, and an electronic signature, and the like. The discount coupon is provided to a customer computer having as the media electronic mail, an Internet site, CD-ROM and so forth. The customer computer sends the discount coupon together with data indicating the purchase product and purchase quantity when ordering a product at a merchant Internet site. The merchant computer provides a discount service to a customer when the electronic signature of the received discount coupon is valid.

19 Claims, 3 Drawing Sheets

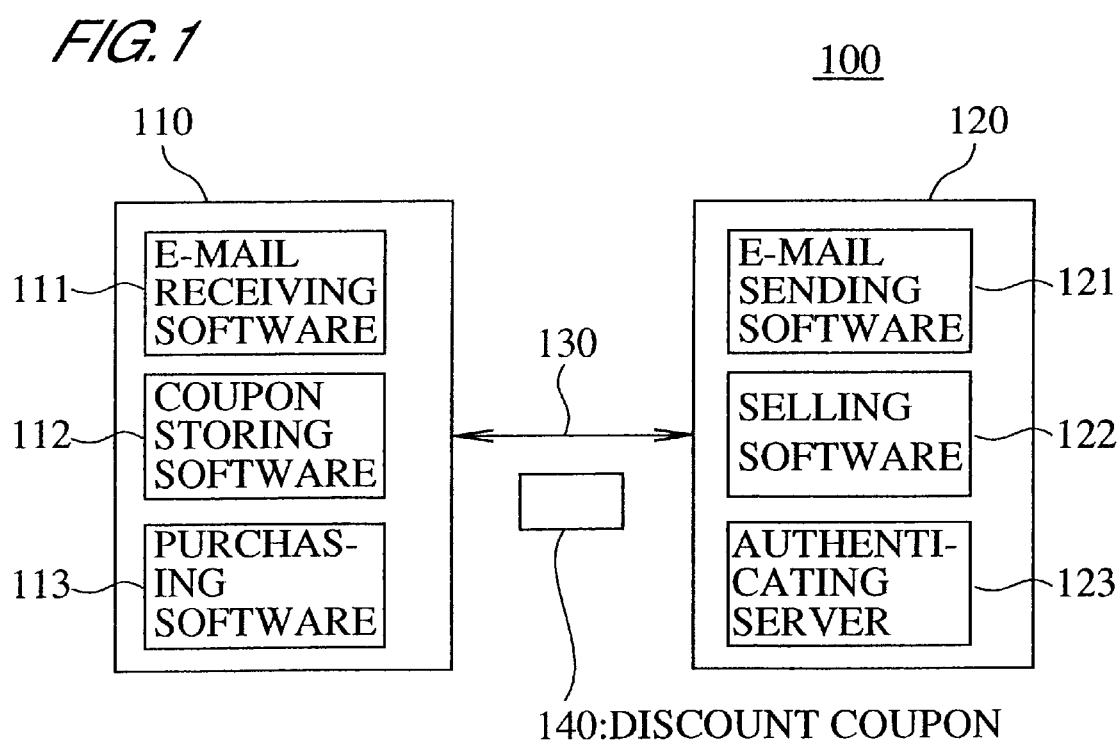

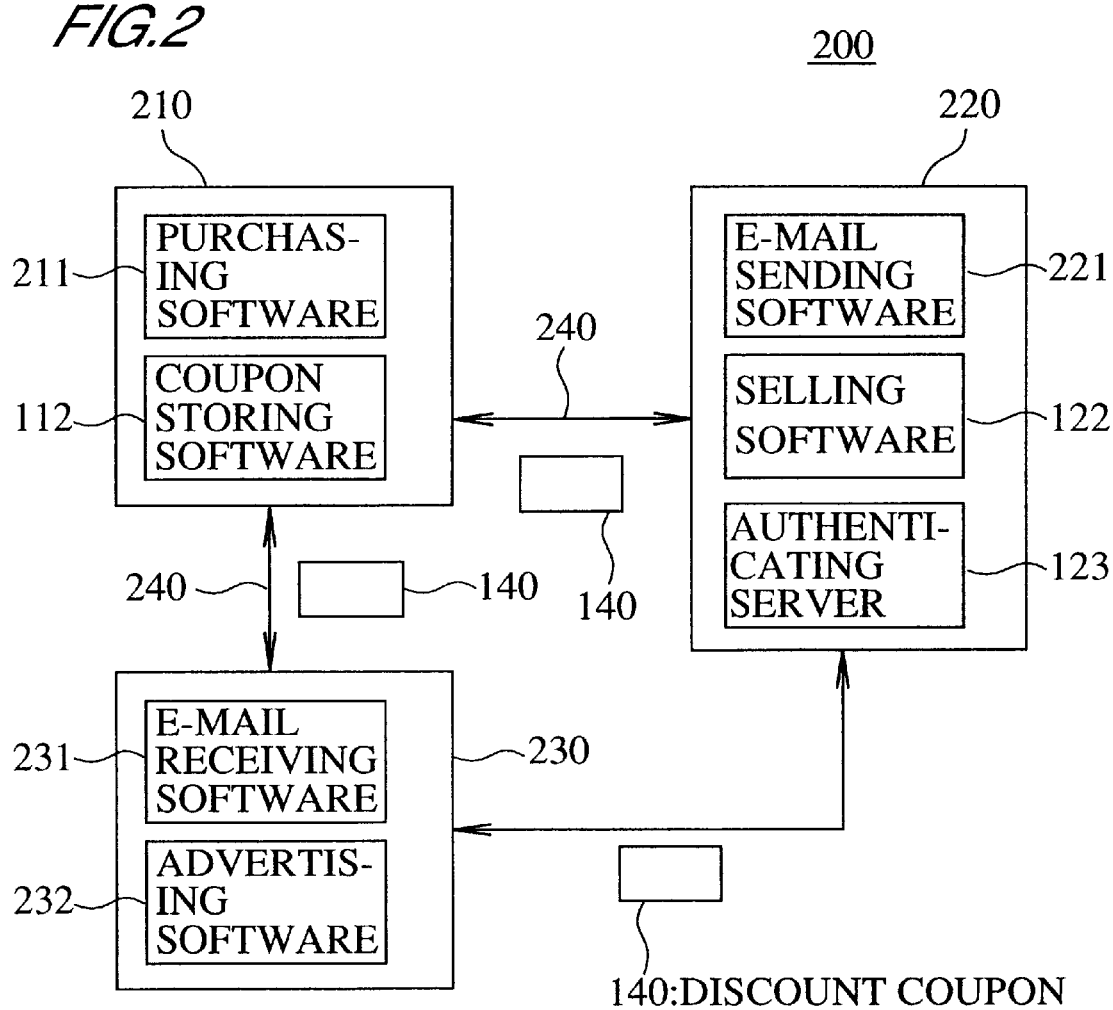

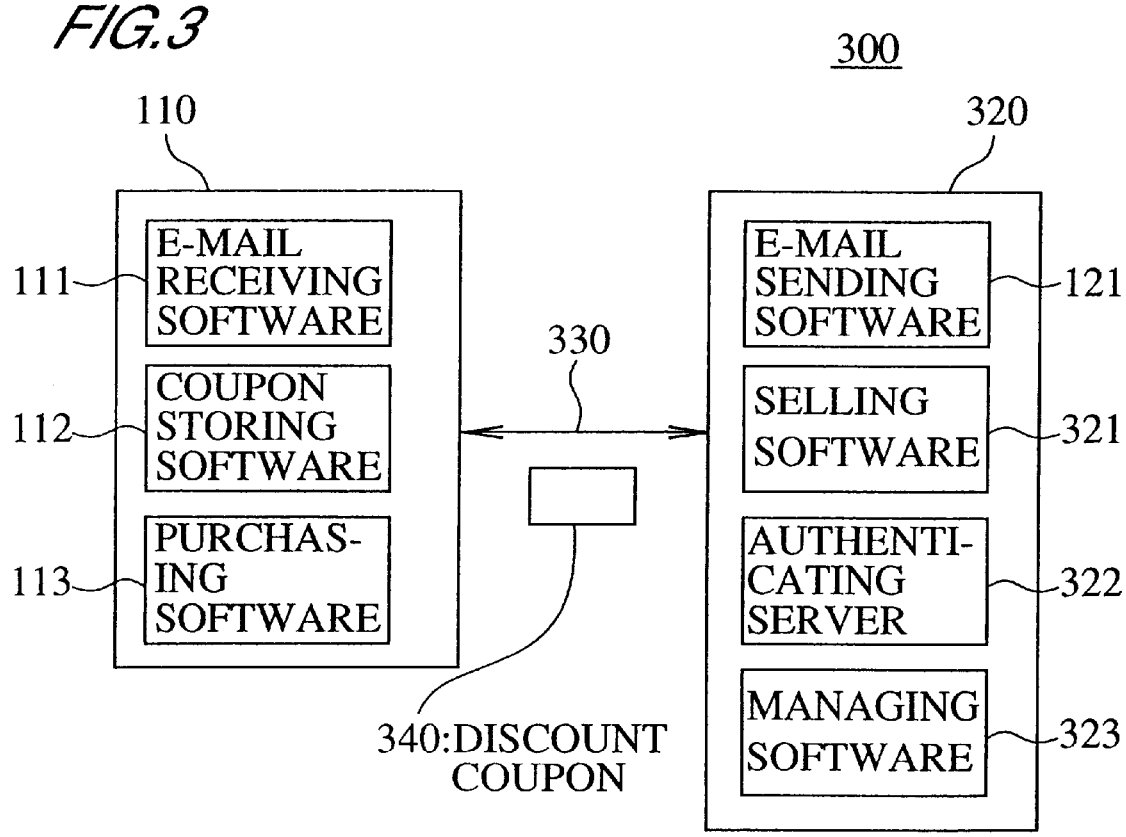

ELECTRONIC SHOPPING SYSTEM

BACKGROUND OF THE INVENTION

1. Field of the Invention

The present invention relates to an electronic shopping system, wherein products are bought and sold using a computer and a telecommunications network.

2. Description of Related Art

An electronic shopping system is known as one aspect of a commercial transaction that does not rely on the physical distribution. An electronic shopping system is a system for buying and selling products using, for example, the Internet or some other telecommunications network and a computer.

With an electronic shopping system, there are cases, in which a discount service is provided, similar to ordinary commercial transactions of stores and the like. Discount service refers to a merchant reducing the selling price of a product in accordance with fixed conditions.

A time service system, volume count system, and point service system, and the like are known as discount services provided by electronic shopping systems. A time service system is a system, wherein a merchant provides a discount service to a customer, who purchases a specified product at a specified time or during a specified time period. A volume count system is a system, wherein a merchant provides a discount service to a customer, who purchases more than a specified quantity of a specified product at the same time. And a point service system is a system, wherein points corresponding to a purchase price or the like are provided to a customer each time he purchases a product, and a discount service of a value that corresponds to the total number of points is provided to the customer.

An electronic shopping system that employs a time service system and a volume count system can readily provide a discount service in accordance with setting in the merchant computer the targeted time or time period, the targeted product, and the purchase quantity which constitute the criteria. However, a system that employs these systems provides a uniform discount service to all customers, and is not capable of providing a different discount service to each customer.

A point service system can provide a different discount service to each customer. However, in an electronic shopping system that employs this system, the merchant's computer system has to manage the points of all the customers. In addition, with an electronic shopping system of this system, even if a merchant would like to provide a service which allows a customer to transfer points to another customer, it is difficult to realize because of the large burden of managing the points of all the customers.

SUMMARY OF THE INVENTION

An object of the present invention is to provide an electronic shopping system, which is capable of easily and flexibly providing a different discount service to each customer.

Consequently, an electronic shopping system related to the present invention comprises a purchasing system, having means for storing in memory discount coupons constituted of electronic data, and means for transmitting to a telecommunications network a discount coupon and data for ordering a product; and a selling system, having means for receiving this discount coupon and this ordering data from a telecommunications network, and means for authenticating the validity of the discount coupon.

The present invention makes possible an easy and flexible discount service in accordance with realizing on an electronic shopping system a discount service that makes use of a discount coupon.

BRIEF DESCRIPTION OF THE DRAWINGS

Other objects and advantages of the present invention are explained below with reference to the accompanying figures.

FIG. 1 is a block diagram showing the constitution of an electronic shopping system related to a first embodiment of the present invention;

FIG. 2 is a block diagram showing the constitution of an electronic shopping system related to a second embodiment of the present invention; and FIG. 3 is a block diagram showing the constitution of an electronic shopping system related to a third embodiment of the present invention.

DESCRIPTION OF THE PREFERRED EMBODIMENTS

First Embodiment

FIG. 1 is a block diagram showing the constitution of an electronic shopping system related to a first embodiment.

The electronic shopping system 100 of this embodiment comprises a customer computer 110, a merchant computer 120, and the Internet telecommunications network 130.

A customer computer 110 comprises a computer main unit, constituting a CPU (Central Processing Unit), a hard disk, memory, and a telecommunications modem, a display or other outputting device, and an inputting device, such as a keyboard, and a mouse, among others. A merchant computer 120 comprises a computer main unit, an outputting device, and an inputting device, just like computer 110. A customer computer 110 can access a merchant computer 120 via the Internet telecommunications network 130. A merchant computer 120 provides a product catalog, and prices, and other product information in response to a computer 110 request. A customer computer 110 orders a product on the basis of this product information.

A customer computer 110 utilizes electronic mail (E-mail) receiving software 111, discount coupon storing software 112, and product purchasing software 113.

Receiving software 111 is software for receiving as electronic mail data a discount coupon 140 from a computer 120.

Storing software 112 is software for storing on a hard disk or other memory a discount coupon 140 that software 111 received. Computer 110 acquires software 112 by downloading software 112 from computer 120 via the telecommunications network 130, and by installing software 112 from CD-ROM or other memory.

Purchasing software 113 is software for communicating with selling software 122 of a merchant computer 120, and perusing product information and ordering a product. When ordering a product, purchasing software 113 sends to selling software 122 a discount coupon 140 received from storing software 112. An ordinary WWW (World Wide Web) browser, for example, can be used as software 113.

A merchant computer 120 utilizes electronic mail sending software 121, product selling software 122, and a discount coupon authenticating server 123.

Sending software 121 is software for sending as electronic mail data a discount coupon 140 to the receiving software 111 of computer 110.

Selling software 122 is software for managing a product that a merchant sells, for allowing the purchasing software 113 of computer 110 to peruse product information, and for receiving a product order from software 113. In addition, software 122 receives a discount coupon 140 from purchasing software 113. An ordinary WWW browser, for example, can be used as software 122.

An authenticating server 123 prepares a discount coupon 140. Further, when selling software 122 receives a discount coupon 140, the authenticating server 123 authenticates the validity of the discount coupon 140 in response to a software 122 request.

A discount coupon 140 comprises a classification code for specifying a product that can be used, a discount amount, and an expiration date, and has an electronic signature of a merchant attached.

The operation of the electronic shopping system 100 shown in FIG. 1 is described hereinbelow.

First, the operation of the electronic shopping system, when a customer computer 110 receives a discount coupon 140, is described.

The authenticating server 123 of computer 120 prepares a discount coupon using the classification code, discount amount, expiration date and other data, and electronic signature data stored inside the server. A discount coupon 140 can be prepared by type of product.

The sending software 121 sends a discount coupon 140 to the receiving software 111 of computer 110. For example, a computer 110, which is registered in a merchant computer 120 as a customer, who wants a discount coupon 140 to be sent, and for which the electronic mail address is known, is selected as the addressee of a discount coupon 140.

The receiving software of the computer 110 extracts data related to a discount coupon 140 from received electronic mail, and sends it to the storing software 112.

The storing software 112 stores the discount coupon 140 on hard disk or other memory.

Next, the operation of the electronic shopping system, when a customer computer 110 purchases a product using a discount coupon 140, is described.

The purchasing software 113 of computer 110 accesses computer 120 and peruses the product information of the selling software 122.

When ordering a product, the purchasing software 113 sends to the selling software 122 the data specifying the product to be purchased, and the purchase quantity, as well as the discount coupon 140 to be utilized in this purchase.

Upon receiving the discount coupon 140 from the purchasing software 113, the selling software 122 sends an authentication request to the authenticating server 123.

The authenticating server 123 authenticates the validity of the discount coupon 140, and sends the authentication results to the selling software 122.

When a discount coupon 140 is authenticated as being valid, the selling software 122 calculates an amount by subtracting the discount amount of the discount coupon 140 from the regular selling price of the ordered product. Next, the selling software 122 sends the calculation results to the purchasing software 113 as the actual selling price. Conversely, when a discount coupon 140 is determined to be invalid, the selling software 122 sends to the purchasing software 113 a notice to the effect that the discount coupon 140 is invalid, and the regular selling price of the ordered product.

The purchasing software 113, upon receiving the actual selling price, sends to the selling software 122 a final decision as to whether or not an order will be placed.

With the electronic shopping system 100 related to this embodiment, because it is possible to distribute to a customer system 110 from a merchant computer 120 a discount coupon 140, which has been converted to electronic data, a different discount service can be provided to each customer.

In addition, since it is not necessary to manage a product targeted for a discount service, and a discount value on a customer-by-customer basis, the management burden on a merchant computer 120 is small.

A customer computer 110 can transfer a discount coupon to another customer by either copying or transmitting the discount coupon 140 data. Therefore, even if a merchant provides a service that allows the transfer of a discount coupon 140, the management burden of the merchant computer 120 does not increase.

Further, since the electronic signature of the merchant is attached to a discount coupon 140, the fraudulent use of this discount coupon 140 can be prevent. That is, the electronic shopping system 100 has high security.

Second Embodiment

FIG. 2 is a block diagram showing the constitution of an electronic shopping system related to a second embodiment.

The electronic shopping system 200 of this embodiment has a customer computer 210, a merchant computer 220, an advertising agent computer 230, and the Internet telecommunications network 240.

In this embodiment, a customer computer 210 acquires a discount coupon 140 from an advertising agent computer 230.

The hardware of a customer computer 210 is the same as the hardware of the computer 110 shown in FIG. 1. The hardware of the merchant computer 220 is the same as the hardware of the computer 120 shown in FIG. 1.

An advertising agent computer 230 comprises a computer main unit, outputting device, and inputting device the same as computers 210, 220.

A customer computer 210 uses discount coupon storing software 112, and product purchasing software 211. Computer 210 does not use electronic mail receiving software.

As the discount coupon storing software 112, the same software as in the case of the aspect of the first embodiment is used.

Purchasing software 211 peruses product data, and places a product order by communicating with the selling software 122 installed in a merchant computer 220. When ordering a product, the purchasing software 211 sends to the selling software 122 a discount coupon 140 received from the storing software 112. In addition, the purchasing software 211 peruses a discount coupon 140, and advertising information (not illustrated) published on the Internet in accordance with advertising software 232, and downloads a discount coupon 140 from the advertising software 232. An ordinary WWW (World Wide Web) browser, for example, can be used as software 211.

A merchant computer 220 uses electronic mail sending software 221, product selling software 122, and a discount coupon authenticating server 123.

The sending software 221 sends a discount coupon 140 and advertising information to the receiving software 231 of computer 230.

As the selling software 122, and authenticating server 123, the same software as in the case of the aspect of the first embodiment is used.

An advertising agent computer 230 uses electronic mail receiving software 231, and advertising software 232.

The receiving software 231 is software for receiving as electronic mail data a discount coupon 140, and advertising information from the sending software 221 of a merchant computer 220.

Advertising software 232 is software for publishing the discount coupon 140, and advertising information that the receiving software 231 receives.

The data constitution of a discount coupon 140 is the same as in the case of the aspect of the first embodiment.

The operation of the electronic shopping system 200 shown in FIG. 2 is described hereinbelow.

First, the operation of the electronic shopping system, when a customer computer 210 receives a discount coupon 140, is described.

The authenticating server 123 of computer 220 prepares a discount coupon 140 similar to the case of the first embodiment.

The sending software 221 sends to the receiving software 231 of computer 230 in accordance with electronic mail data, which appends a discount coupon 140 to advertising information.

The receiving software 231 extracts, and sends to the advertising software 232 data related to the discount coupon 140 and advertising information from the received electronic mail. The advertising software 232 publishes the discount coupon 140 and advertising information on the Internet.

The purchasing software 211 of computer 210 peruses via the Internet telecommunications network 240 the advertising information published in accordance with the advertising software 232. In addition, the purchasing software 211 downloads from this advertising software 232 a discount coupon 140 of the type the user desires.

The storing software 112 stores a discount coupon 140 on a hard disk or other memory.

The customer computer 210 can acquire a discount coupon 140 in this manner.

The procedure for purchasing a product using a discount coupon 140 is the same as in the case of the system 100 of the first embodiment, and as such, the description thereof is omitted.

The system 200 of this embodiment can produce the same effects as the effects described with regard to the first embodiment. In addition, since system 200 is capable of publishing a discount coupon 140 in accordance with an advertising agent computer 230, it becomes easy to distribute a discount coupon 140 to the computers 210 of large numbers of unspecified customers.

Third Embodiment

FIG. 3 is a block diagram showing the constitution of an electronic shopping system related to a third embodiment.

The electronic shopping system 300 of this embodiment has a customer computer 110, a merchant computer 320, and the Internet telecommunications network 330.

The hardware of the customer computer 110 is the same as the hardware of the computer 110 shown in FIG. 1. The hardware of the merchant computer 320 is the same as the hardware of the computer 120 shown in FIG. 1.

The customer computer 110 uses electronic mail receiving software 111, discount coupon storing software 112, and product purchasing software 113, the same as computer 110.

The merchant computer 320 uses electronic mail sending software 121, product selling software 321, a discount coupon authenticating server 322, and serial number managing software 323.

As the sending software 121, the same software as in the case of the first embodiment is used.

The selling software 321 is software for managing a product that a merchant sells, for perusing product information in accordance with the purchasing software 113 of computer 110, and for receiving a product order from software 113. When software 321 receives a discount coupon 340 from purchasing software 113, software 321 requests that the authenticating server 322 make a determination as to the validity of the electronic signature, and asks the managing software 323 whether or not it is authorized to use the discount coupon. An ordinary WWW browser, for example, can be used as software 321.

The authenticating server 322 prepares a discount coupon 340, which has a serial number attached. Further, when the selling software 321 receives a discount coupon 340, the authenticating server 322 authenticates the validity of the discount coupon 340 in response to a software 321 request.

Managing software 323 is software for managing, by classification code and serial number, the number of times a discount coupon 340 is capable of being used, and the number of times a discount coupon 340 has been used.

The discount coupon 340 comprises data, such as a classification code for specifying a product that can be used, a discount amount, and an expiration date, as well as a serial number. A merchant electronic signature is attached to the discount coupon 340.

The operation of the electronic shopping system 300 shown in FIG. 3 is described hereinbelow.

First, the operation of the electronic shopping system when a customer computer 110 receives a discount coupon 340, is described.

The authenticating server 322 of computer 320 prepares a discount coupon 340 using the classification code, discount amount, expiration date, serial number and other information, and electronic signature data stored inside the server. A discount coupon 340 can be prepared by type of product. The method for stipulating a serial number is arbitrary. For example, the serial number attached to each individual product can be utilized as-is as a discount coupon 340 serial number.

The sending software 121 sends a discount coupon 340 to the receiving software 111 of computer 110, the same as the first embodiment.

The receiving software 111 extracts, and sends to the storing software 112 data related to the discount coupon 340 from the received electronic mail.

The storing software 112 stores the discount coupon 340 on hard disk or other memory.

Next, the operation of the electronic shopping system, when a customer computer 110 purchases a product using a discount coupon 340, is described.

The purchasing software 113 of computer 110 peruses the product information of the selling software 321, and sends data specifying a product to be purchased, and the discount coupon 340 via electronic mail.

Upon receiving an electronic mail, the selling software 321 sends an authentication request to the authenticating server 322, and sends a determination request to the managing software 323.

The authenticating server 322 authenticates the validity of the discount coupon 340, and sends the authentication results to the selling software 321.

The managing software 323 determines whether or not the number of times the discount coupon 340 was used exceeds the number of times the discount coupon 340 is capable of being used, and sends the determination results to the selling software 321. When it is determined that the discount coupon 340 utilization frequency does not exceed the number of times the discount coupon 340 is capable of being used, the managing software 323 increments by "1" the utilization frequency stored value.

The selling software 321 determines whether or not a discount service is provided based on the authentication results and determination results. When a discount service is provided, the selling software 321 calculates a value by subtracting the discount value of the discount coupon 340 from the regular selling price of the ordered product. Next, the selling software 321 sends the calculation results to the purchasing software 113 as the actual selling price. Conversely, when a discount service is not provided, the selling software 321 sends to the purchasing software 113 a notice to the effect that the discount coupon 340 is invalid, and the regular selling price of the ordered product.

The purchasing software 113, upon receiving the actual selling price, sends to the selling software 321 a final decision as to whether or not an order will be placed.

With the electronic shopping system 300 related to this embodiment, it is possible to attach a serial number to all discount coupons 340, and to manage the utilization frequency thereof using a serial number. Therefore, in accordance with this system 300, it is possible to prevent a single discount coupon 340 from being copied and used freely. This system 300 is especially effective, when providing a discount service, such as, for example, a service that provides a higher version of a software product to a specified customer only.

In addition, the electronic shopping system 300 related to this embodiment enables the provision of a different discount service to each customer, the same as the first embodiment, reduces the merchant management burden, and offers outstanding security.

In each of the above-described embodiments, a discount coupon was sent to the computer of a customer by electronic mail. When product information or discount coupon storing software stored on a CD-ROM or other memory is provided to a customer, a discount coupon can also be provided to the customer using this memory. When a discount coupon is provided using a memory, a function for storing on a hard disk or a similar storage the discount coupon data read from memory is attached to the discount coupon storing software.

What is claimed is:

1. An electronic shopping system for ordering a product via a public telecommunications network, comprising:
    a purchasing system, having means for storing in memory a discount coupon constituted from electronic data, means for sending to said public telecommunications network electronic data containing said discount coupon and information for ordering said product, means for receiving a final selling price from said public telecommunications network, and means for sending an order to buy said product at said final selling price; and
    a selling system having means for receiving said discount coupon and said ordering information from said public telecommunications network, means for authenticating the validity of said discount coupon, means for deciding said final selling price of said product based on the validity of said discount coupon as determined by said authenticating means, means for sending said final selling price to said public telecommunications network, and means for receiving said order for buying said product at said final selling price.

2. The electronic shopping system according to claim 1, wherein said purchasing system has means for perusing product information via said public telecommunications network, and said selling system has means for publishing said product information via said public telecommunications network.

3. The electronic shopping system according to claim 2, wherein said purchasing system sends to said selling system said electronic data containing said discount coupon and said ordering information for said product, using said perusing means.

4. The electronic shopping system according to claim 1, wherein said authenticating means determines the validity of said discount coupon using an electronic signature contained in said discount coupon.

5. The electronic shopping system according to claim 1, wherein said purchasing system has means for receiving said discount coupon from said public telecommunications network, and said selling system has means for sending said discount coupon to said public telecommunications network.

6. The electronic shopping system according to claim 1, wherein said selling system has means for preparing said discount coupon.

7. The electronic shopping system according to claim 1, wherein said discount coupon is sent via electronic mail to said purchasing system from said selling system.

8. The electronic shopping system accord claim 1, further comprising an advertising system for providing said discount coupon to said purchasing system.

9. The electronic shopping system accord to claim 8, wherein said advertising system comprises means for receiving said discount coupon via said public telecommunications network, and said selling system comprises means for sending said discount coupon via said public telecommunications network.

10. The electronic shopping system according to claim 9, wherein said discount coupon is sent from said selling system via electronic mail to said advertising system.

11. The electronic shopping system accord to claim 8, wherein said advertising system has means for publishing product advertising information via said public telecommunications network, and said purchasing system has means for perusing said product advertising information via said public telecommunications network.

12. The electronic shopping system accord to claim 11, wherein said publishing means sends said discount coupon to said purchasing system via said public telecommunications network.

13. The electronic shopping system according to claim 1, wherein said selling system has means for determining the number of times said discount coupon has been utilized through the use of a serial number contained in said discount coupon.

14. The electronic shopping system according to claim 13, wherein said determining means makes a determination to the extent that use of said discount coupon is not authorized when said utilization frequency exceeds a predetermined number.

15. The electronic shopping system accord to claim 1, wherein said storing means stores said discount coupon received via said public telecommunications network in said memory.

16. The electronic shopping system according to claim 1, wherein said storing means stores said discount coupon read out from external memory in said memory.

17. The electronic shopping system accord to claim 1, wherein said discount coupon comprises data for identifying said product to be discounted and data for indicating a discount amount.

18. The electronic shopping system accord claim 17, wherein said selling system comprises means for calculating said final selling price of said product using said discount amount data.

19. The electronic shopping system accord to claim 1, wherein said public telecommunications network is the Internet telecommunications network.

* * * * *